(12) United States Patent
Kaufman et al.

(10) Patent No.: US 10,605,934 B2
(45) Date of Patent: Mar. 31, 2020

(54) APPARATUS WITH THERMAL STRESS RELIEF MECHANISM FOR HEAT GENERATING COIL AND ASSOCIATED METHODS

(71) Applicant: PGS Geophysical AS, Lilleaker, Oslo (NO)

(72) Inventors: Rick Kaufman, Ames, IA (US); Aaron McGregor, Ames, IA (US); Todd Allan Reinders, Ames, IA (US)

(73) Assignee: PGS Geophysical AS, Oslo (NO)

( * ) Notice: Subject to any disclaimer, the term of this patent is extended or adjusted under 35 U.S.C. 154(b) by 690 days.

(21) Appl. No.: 15/193,765

(22) Filed: Jun. 27, 2016

(65) Prior Publication Data

US 2017/0059725 A1    Mar. 2, 2017

Related U.S. Application Data

(60) Provisional application No. 62/211,957, filed on Aug. 31, 2015.

(51) Int. Cl.
| | |
|---|---|
| *G01V 1/00* | (2006.01) |
| *G01V 1/02* | (2006.01) |
| *G10K 9/12* | (2006.01) |
| *G01V 1/145* | (2006.01) |
| *G01V 1/38* | (2006.01) |

(52) U.S. Cl.
CPC ............... *G01V 1/02* (2013.01); *G01V 1/145* (2013.01); *G01V 1/3808* (2013.01); *G10K 9/121* (2013.01); *G01V 2210/1293* (2013.01)

(58) Field of Classification Search
USPC ........................................................ 367/143
See application file for complete search history.

(56) References Cited

U.S. PATENT DOCUMENTS

| | | | |
|---|---|---|---|
| 1,164,452 A | 12/1915 | Beisrsdorf | |
| 1,351,424 A | 8/1920 | Jenkins | |
| 4,009,461 A | 2/1977 | Usry | |
| 6,218,995 B1 | 4/2001 | Higgins et al. | |
| 8,446,798 B2 | 3/2013 | Tenghamn | |
| 8,670,292 B2 | 3/2014 | Engdahl | |
| 9,188,691 B2 | 11/2015 | Südow et al. | |
| 9,341,725 B2 | 5/2016 | Tenghamn | |
| 9,618,637 B2* | 4/2017 | Tenghamn | G01V 1/04 |
| 9,645,264 B2* | 5/2017 | Zrostlik | G01V 1/04 |

(Continued)

FOREIGN PATENT DOCUMENTS

| | | |
|---|---|---|
| GB | 640462 | 7/1950 |
| GB | 1120151 | 7/1968 |
| WO | 0071266 | 11/2000 |

OTHER PUBLICATIONS

European Search Report for Application No. EP 16 18 5851 dated Jan. 30, 2017.

(Continued)

*Primary Examiner* — James R Hulka

(57) ABSTRACT

Embodiments related to marine acoustic vibrator for marine geophysical surveys. An embodiment may include an apparatus, wherein the apparatus may comprise: a coil element comprising a coil; a coil clamp constraining motion of the coil element in at least one direction; and a spring disposed in a load path of the coil clamp. Additional apparatus and methods are disclosed herein.

25 Claims, 9 Drawing Sheets

(56) References Cited

U.S. PATENT DOCUMENTS

| | | | |
|---|---|---|---|
| 9,864,080 B2* | 1/2018 | Tenghamn | G01V 1/135 |
| 9,995,834 B2* | 6/2018 | Tenghamn | G01V 1/133 |
| 2011/0317515 A1* | 12/2011 | Tenghamn | G01V 1/145 |
| | | | 367/20 |
| 2013/0010571 A1* | 1/2013 | Sudow | G01V 1/3826 |
| | | | 367/16 |
| 2014/0226439 A1 | 8/2014 | Tenghamn | |
| 2014/0334254 A1 | 11/2014 | Zrostlik | |
| 2014/0334259 A1 | 11/2014 | Tenghamn | |
| 2014/0340985 A1 | 11/2014 | Tenghamn | |
| 2015/0085605 A1 | 3/2015 | Tenghamn | |
| 2015/0085606 A1 | 3/2015 | Tenghamn | |
| 2015/0085607 A1* | 3/2015 | Tenghamn | G01V 1/145 |
| | | | 367/15 |
| 2015/0085608 A1 | 3/2015 | Tenghamn | |

OTHER PUBLICATIONS

Feng et al., "A Class IV Flextensional Device Based on Electrostrictive Poly(vinylidene fluoride-trifluoroethylene," Jun. 2003, pp. 1-6.
Fons Ten Kroode et al., "Broadband seismic data—The importance of low frequencies," Geophysics, Mar.-Apr. 2013, pp. WA3-WA14, vol. 78, No. 2.
Rune Tenghamn, "PGS Electrical Marine Vibrator," Tech Link, Nov. 2005, pp. 1-3, vol. 5, No. 11, Publication of PGS Geophysical.
Rune Tenghamn and Andrew Long, "PGS shows off electrical marine vibrator to capture 'alternative' seismic source market," First Break, Jan. 2006, pp. 11-14, vol. 24.
Rune Tenghman, "Complementing Seismic Source Technology with Marine Vibrators," Presented at PGS Technology day in Oslo, Norway, Oct. 16, 2012.
Ralph S. Woollett, "Current Approaches to the Miniaturization and Pressure Release Problems of VLF Transducers," Naval Underwater Systems Center, Nov. 5, 1973.
Ralph S. Woollett, "Underwater Helmholtz-Resonator Transducers: General Design Principles," NUSC Technical, Jul. 5, 1977.
European Search Report for Application No. EP 16 18 5851 dated Apr. 18, 2017.

* cited by examiner

APPARATUS WITH THERMAL STRESS RELIEF MECHANISM FOR HEAT GENERATING COIL AND ASSOCIATED METHODS

CROSS-REFERENCE TO RELATED APPLICATIONS

The present application claims the benefit of U.S. Provisional Application No. 62/211,957, filed Aug. 31, 2015, entitled "Thermal Stress Relief Mechanism for Heat Generating Coil," the entire disclosure of which is incorporated herein by reference.

BACKGROUND

Sound sources are generally devices that generate acoustic energy. One use of sound sources is in marine seismic surveying in which the sound sources may be employed to generate acoustic energy that travels downwardly through water and into subsurface formations. After interacting with the subsurface formations, some of the acoustic energy may be returned toward the water surface and detected by specialized sensors, such as hydrophones or geophones. The detected energy may be used to infer certain properties of the subsurface formations, such as structure, mineral composition and fluid content, thereby providing information useful in the recovery of hydrocarbons.

One type of sound source that may be used in marine seismic surveying may be a marine acoustic vibrator. Increasing the acoustic output of marine acoustic vibrators may require an increase in input power that may result in an increase in heat generation. "Moving-coil," also referred to as "voice-coil" transducers, may be employed in marine acoustic vibrators, for example, to provide the ability to generate very large acoustic amplitude. However, while some marine acoustic vibrators may exhibit comparatively high sound pressure levels versus previous sound sources, these marine acoustic vibrators may exhibit various challenges with thermal management, for example. One such challenge may include design of the coil element, which should be able to withstand high power densities while maintaining contact with the acoustic load (e.g., vibrating shell, etc.). These constraints may result in induced thermal strain within the marine acoustic vibrator and/or within the coil element itself.

BRIEF DESCRIPTION OF THE DRAWINGS

These drawings illustrate certain aspects of some of the embodiments of the present invention and should not be used to limit or define the invention.

DETAILED DESCRIPTION

Embodiments relate generally to marine acoustic vibrators for marine geophysical surveys. More particularly, embodiments relate to use of mechanisms for thermal stress relief in the coil element of a moving-coil transducer used in marine acoustic vibrators. In some embodiments, techniques may be used to reduce pre-compression forces in the coil and, thus, also reduce thermal stress that may result from high power density operation. In some embodiments, a spring may be employed to allow the coil element to thermally expand without undesired twisting or translating. By way of example, the spring may be disposed in a load path of the clamping element used to constrain movement of the coil element.

Embodiments may include an apparatus. The apparatus may include a coil element comprising a coil. The apparatus may further include a coil clamp constraining motion of the coil element in at least one direction. The apparatus may further include a spring disposed in a load path of the coil clamp.

Embodiments may include a marine acoustic vibrator. The marine acoustic vibrator may include a vibrating element and a moving-coil transducer coupled to the vibrating element. The moving-coil transducer may be operable to effect vibration of the vibrating element. The moving-coil transducer may include a coil element, a coil clamp constraining motion of the coil element in at least one direction, and a spring disposed in a load path of the coil clamp.

Embodiments may include a method. The method may include disposing a marine acoustic vibrator in a body of water and actuating a moving-coil transducer of the marine acoustic vibrator to cause a vibrating element of the marine acoustic vibrator to generate acoustic energy. A spring may be arranged to allow thermal expansion of a coil element of the moving-coil transducer.

Embodiments may include a method. The method may include providing a coil element. The method may further include clamping the coil element using a coil clamp to constrain the coil element in at least one direction. A spring may be disposed in a load path of the coil clamp. The method may further include disposing the coil element in an air gap of a magnetic assembly.

Figure 1:
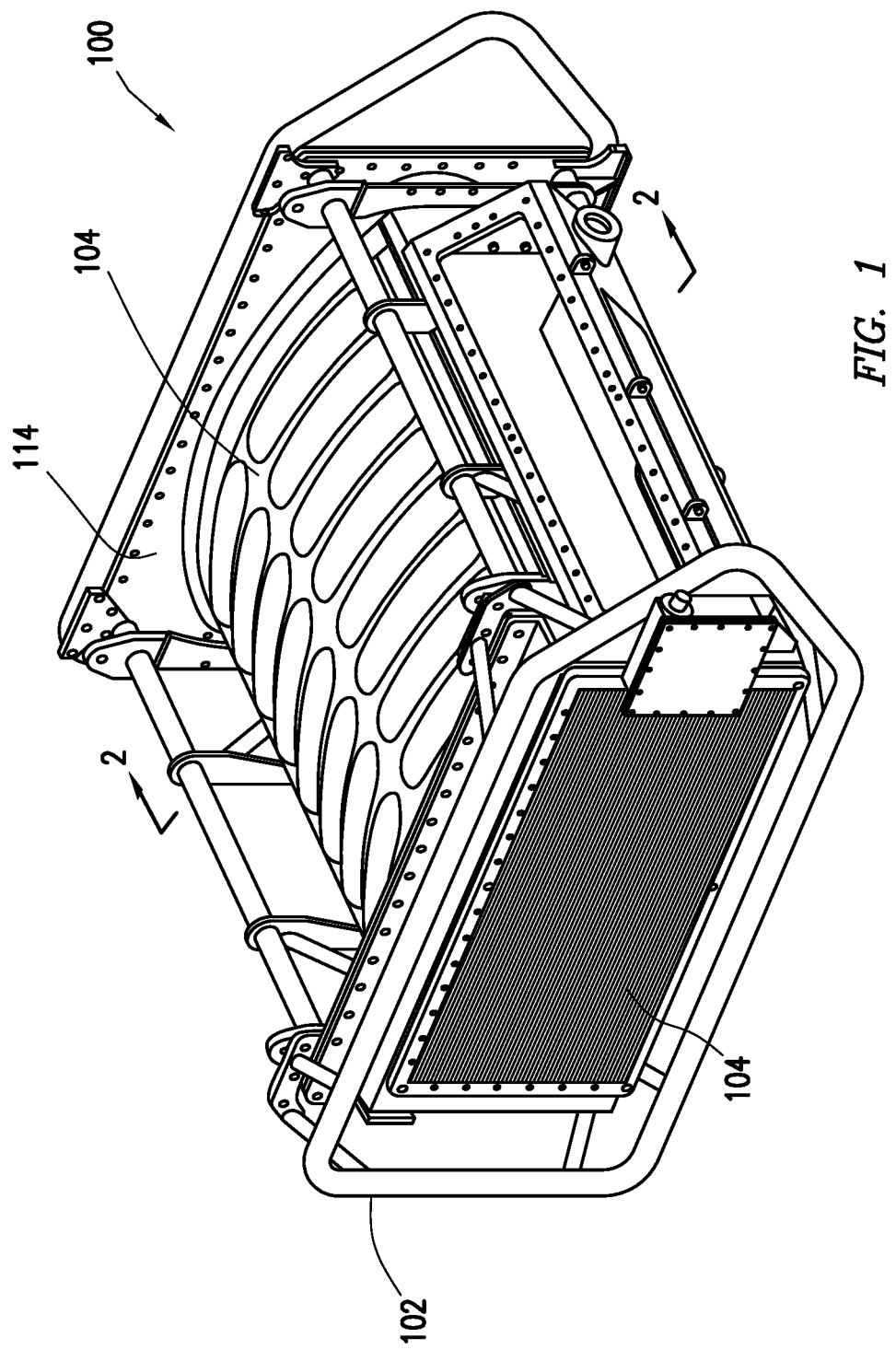
FIG. 1 illustrates a marine acoustic vibrator in accordance with present embodiments.
Figure 2:
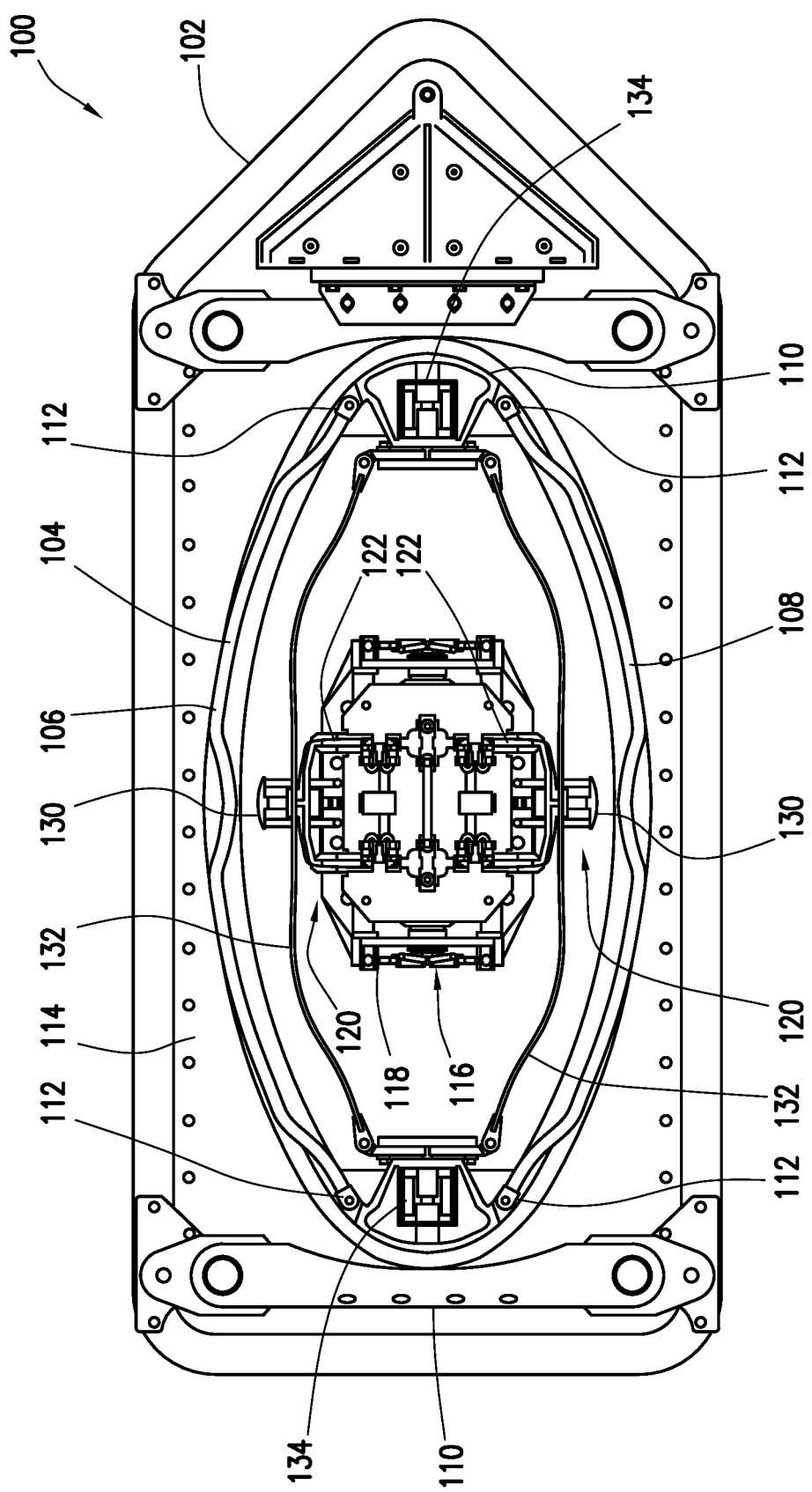
FIG. 2 illustrates the marine acoustic vibrator of FIG. 1 in cross-section in accordance with present embodiments.

FIGS. 1 and 2 illustrate a marine acoustic vibrator 100 in accordance with example embodiments. FIG. 2 is a cross-sectional view of the marine acoustic vibrator 100 taken along plane 2 of FIG. 1. In the illustrated embodiment, the marine acoustic vibrator 100 may be mounted within a frame 102. The frame 102 may be used for deploying the marine acoustic vibrator 100 in the water. The marine acoustic vibrator 100 may further comprise a vibrating element, such as flextensional shell 104. In a particular embodiment, the flextensional shell 104 may comprise two side portions that may be mirror images of one another, best seen on FIG. 2, as first shell side portion 106 and second shell side portion 108. The flextensional shell 104 may further comprise endbeams 110. The first shell side portion 106 and second shell side portion 108 may be flexibly coupled to the endbeams 110 (e.g., using hinges 112 or some other flexible element as shown on FIG. 2). The flextensional shell 104 may complete an enclosure surrounding other components of the marine acoustic vibrator 100. With continued reference to FIGS. 1 and 2, the marine acoustic vibrator 100 may further comprise top and bottom endplates 114. The flextensional shell 104 may be attached to the top and bottom endplates 114. In some embodiments, the connection between the flextensional shell 104 and top and bottom endplates 114 may be a flexible connection.

Although the flextensional shell 104 is depicted on FIGS. 1 and 2 as being essentially elliptic in shape, flextensional shells of other shapes, including convex, concave, flat, or combinations thereof, may also be used in accordance with embodiments of the present invention. As illustrated, the flextensional shell 104 may comprise first and second shell side portions 106, 108. The first and second shell side portions 106, 108 may comprise spring steel, beryllium copper alloy, glass fiber reinforced plastic, carbon fiber reinforced or other suitable flexible spring material. Suitable flexible spring materials may have a high yield strength and not permanently deform when acted on by the moving-coil transducer 116. Flextensional transducers have been divided into seven classes according to the shape of the shell and the configuration of the drive elements. In some embodiments, the first and second shell side portions 106, 108 may be a class V flextensional transducer. However, those of ordinary skill in the art, with the benefit of this disclosure, should be able to select other types of flextensional transducers that may be suitable for use in present embodiments. While FIGS. 1 and 2 illustrate the vibrating element as a flextensional shell 104, it should be understood that embodiments may use other suitable vibrating elements, such as plates, with marine acoustic vibrator 100.

Figure 3:
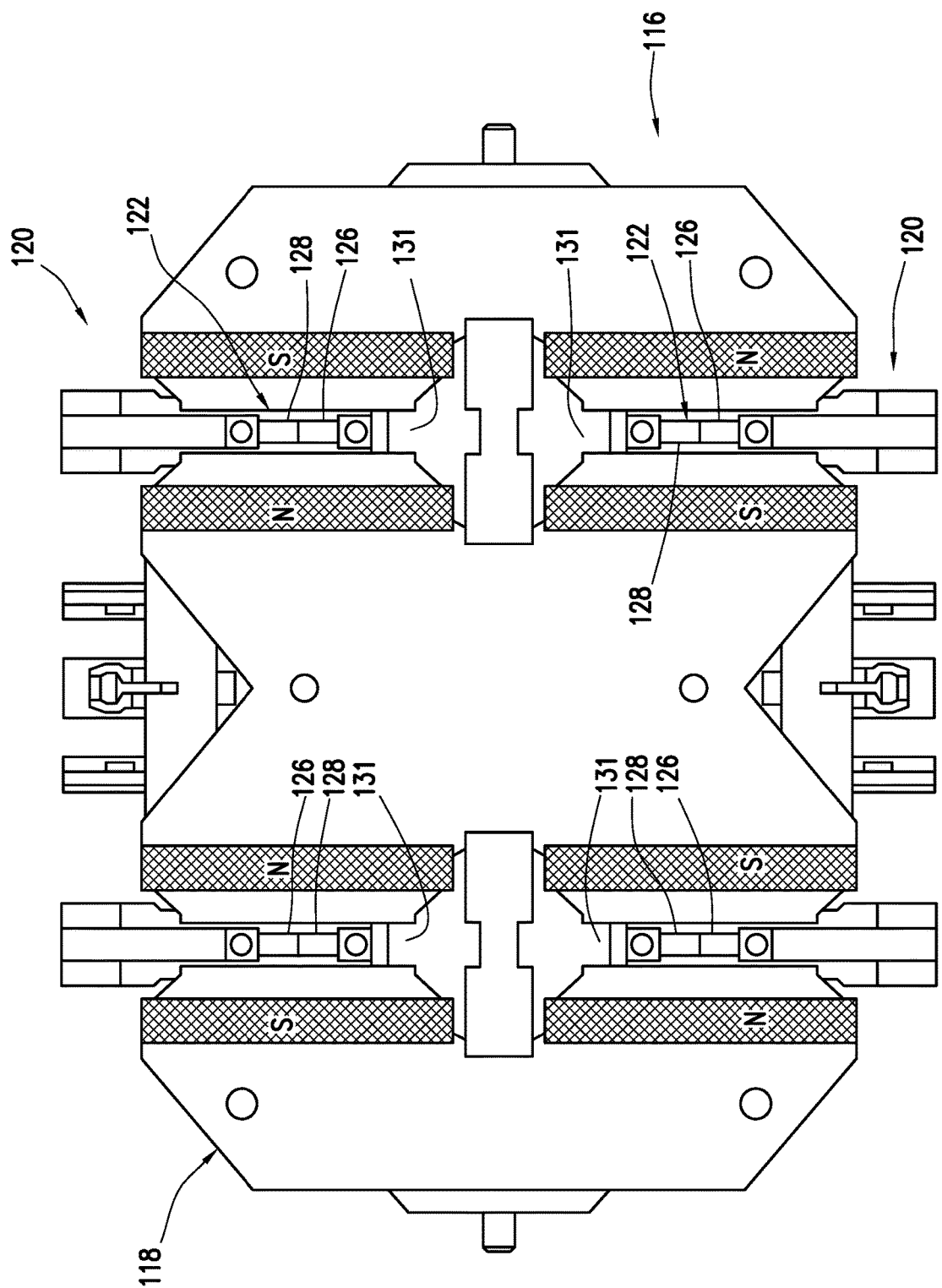
FIGS. 3 and 4 illustrate a moving-coil transducer in accordance with present embodiments.
Figure 4:
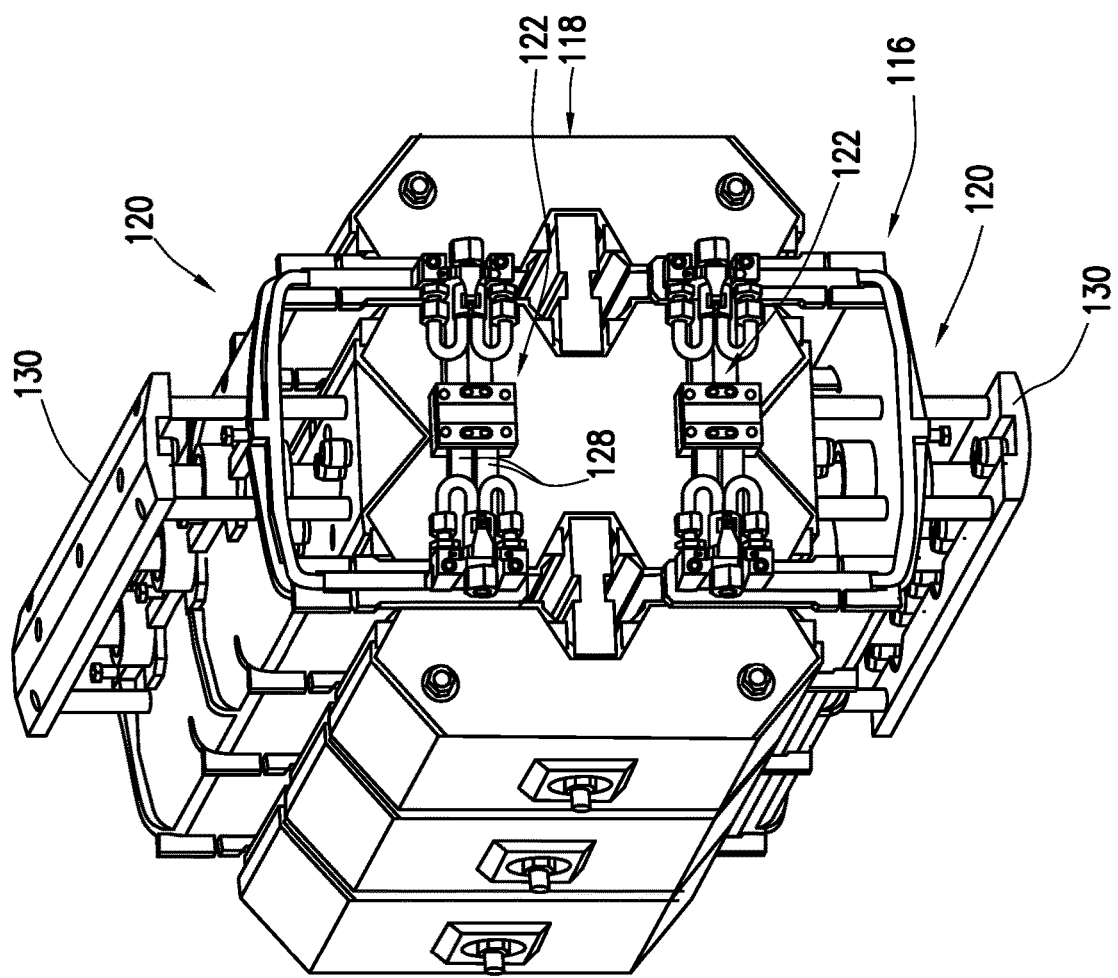

FIG. 2 illustrates the marine acoustic vibrator 100 in cross-section in accordance with example embodiments. As illustrated, the marine acoustic vibrator 100 may include a moving-coil transducer 116. The moving-coil transducer 116 may be operable to effect vibration of the vibrating element, such as flextensional shell 104. By way of example, the moving-coil transducer 116 of the marine acoustic vibrator 100 may be actuated to cause vibration of flextensional shell 104, thus converting motion of moving-coil transducer to sound energy. With additional reference to FIGS. 3 and 4, the moving-coil transducer will be described in accordance with example embodiments. Moving-coil transducer 116 may provide the ability to generate very large acoustic amplitudes. Seismic sources using one or more moving-coil transducers 116 may be referred to as "moving-coil" projectors. Although FIGS. 2-4 illustrate a single, bi-directional moving-coil transducer, embodiments with one or more uni-directional moving-coil transducers or in which a plurality of moving-coil transducers are used in parallel are within the scope of the invention. As best seen on FIG. 2, the moving-coil transducer 116 may be centrally mounted in the flextensional shell 104. While not shown, the moving-coil transducer 116 may be mounted on a fixture capable of suspending the moving-coil transducer 116 within the flextensional shell 104. The fixture may be coupled to the flextensional shell 104. For example, the fixture may be coupled to the endbeams 110 using any suitable technique, including linear bearings.

With continued reference to FIGS. 2-4, the moving-coil transducer 116 may comprise a magnetic assembly 118 and coil assemblies 120. The magnetic assembly 118 may comprise permanent magnetic material. While FIG. 2 illustrates the use of a pair of coil assemblies 120 that share magnetic material, it should be understood that the coil assemblies 120 may each have separate magnetic material, in some embodiments. As illustrated, embodiments may comprise a pair of coil assemblies 120 positioned on opposite sides of the moving-coil transducer 116. The coil assemblies 120 may each comprise a coil element 122. As best seen on FIG. 3, the coil elements 122 may each comprise a pair of coils 128 that may be mechanically coupled. The coil elements 122 may be positioned in corresponding air gaps 131 in the magnetic assembly 118. The coil elements 122 may each be coupled to corresponding transmission elements 130. When a current is sent through the coil elements 122, a magnetic field may be created. The magnetic field may interact with the field from the magnetic assembly 118, which may comprise permanent magnetic material, and provide relative movement of the parts. The transmission elements 130 may be used to transfer force from the moving-coil transducer 116 to the spring elements 132 and/or the flextensional shell 104.

As illustrated on FIG. 2, the spring elements 132 may be disposed within the flextensional shell 104. Without limitation, the spring elements 132 may generally function to transform movement of the coil elements 122 into movement of the flextensional shell 104. In addition, the spring elements 132 may also function to form a resonant system that improves the efficiency of generating acoustic energy in a marine environment. In FIG. 2, example embodiments are shown in which the spring elements 132 may have a slightly arched shape. In embodiments, the spring elements 132 may be shaped as flexible plates, rods, beams, or bars, for example, and may preferably be fastened to the fastening devices 134 and may be allowed to rotate. When the fastening devices 134 may be pulled inwards by the spring elements 132, the flextensional shell 104 may widen, creating a pressure wave in the environment. This way the movements of the moving-coil transducer 116 should propagate outwards and result in acoustic waves in the water. By varying the eccentricity of the flextensional shell 104 and the transmission rate in the moving-coil transducer 116, embodiments may be adapted to different situations. It should be understood that the present invention should not be limited to the particular configuration shown on FIGS. 1-4, and other configurations of the marine acoustic vibrator 100 may be used in accordance with embodiments of the present invention.

Figure 5:
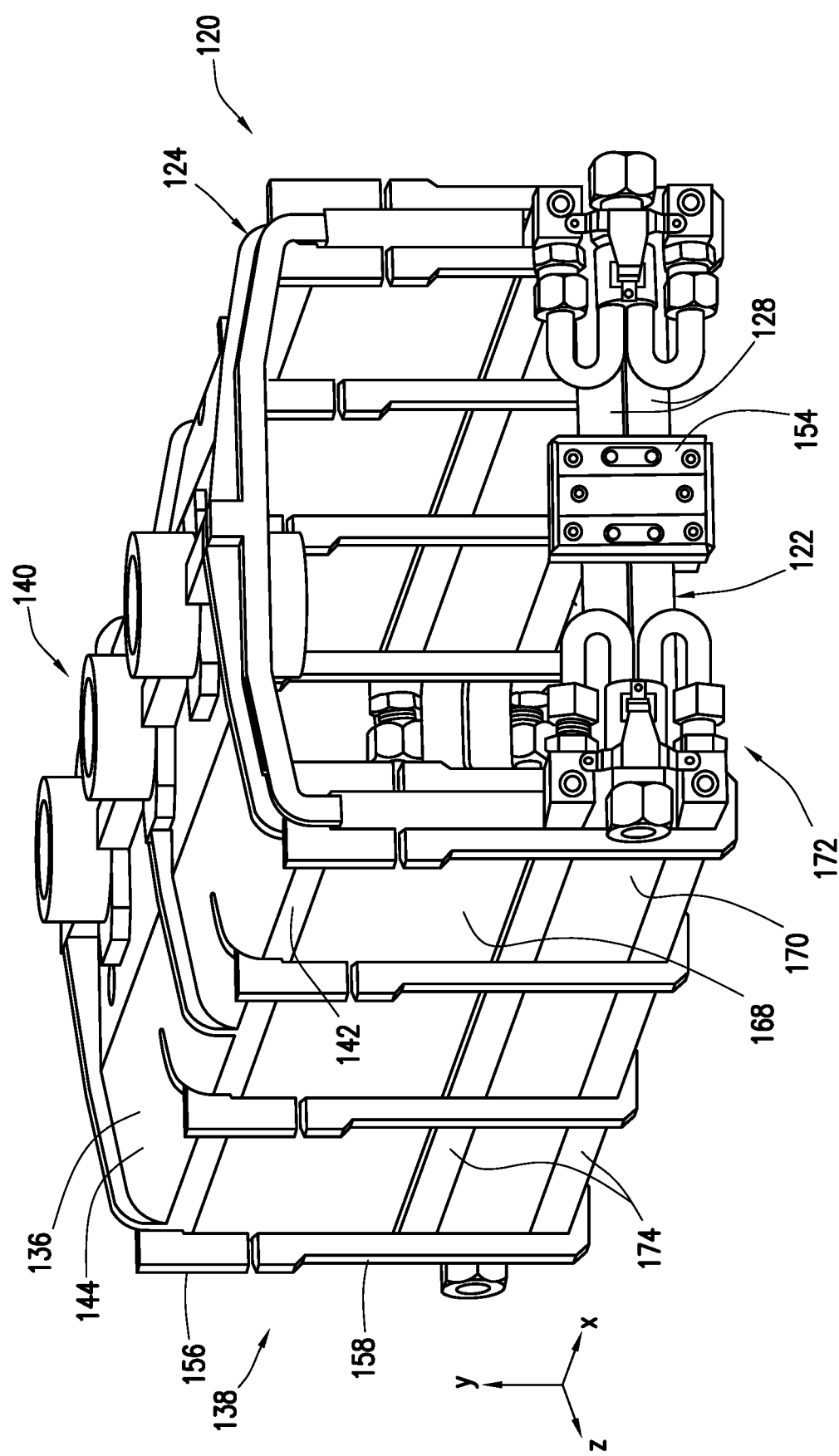
FIG. 5 illustrates a coil assembly for a marine acoustic vibrator in accordance with present embodiments.
Figure 6:
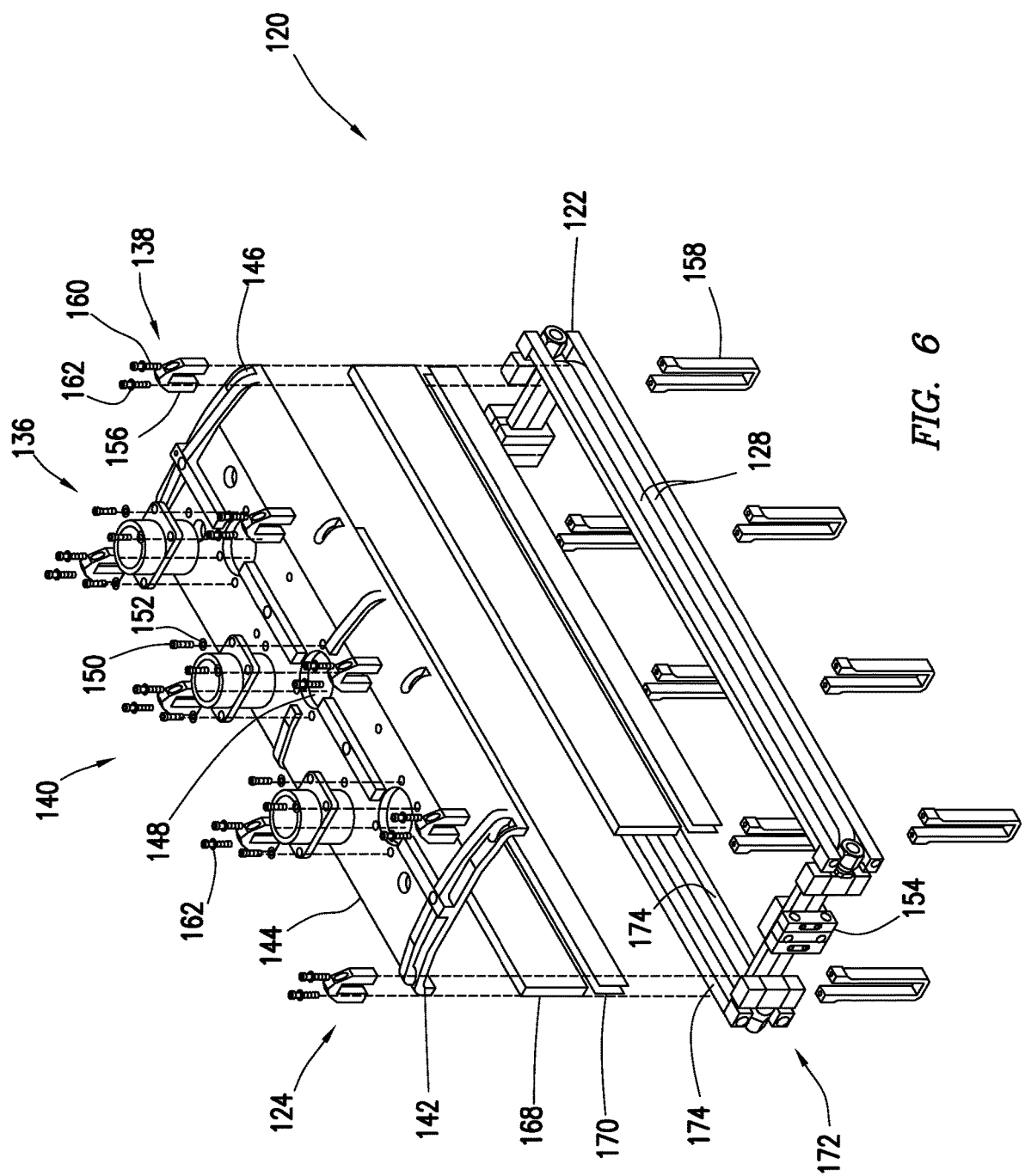
FIG. 6 is an exploded view the coil assembly of FIG. 5 in accordance with present embodiments.
Figure 7:
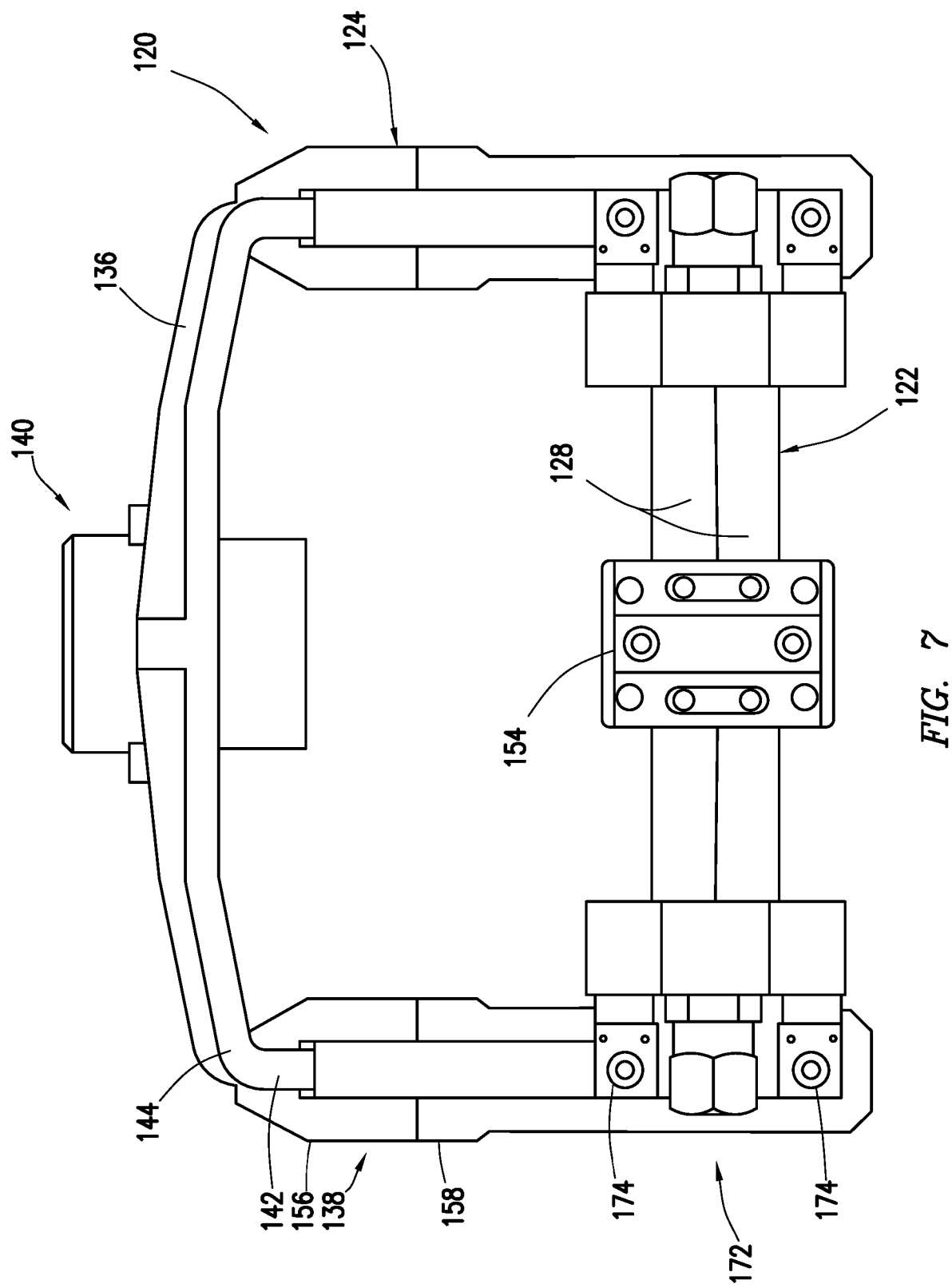
FIG. 7 illustrates an end view of the coil assembly of FIG. 5 in accordance with present embodiments.

Referring now to FIGS. 5-7, a coil assembly 120 will be described in more detail in accordance with example embodiments. As illustrated, the coil assembly 120 may comprise a compression assembly 124. In some embodiments, the compression assembly 124 may assist in compressing the coil element 122, for example, to minimize thermal strain effects. For example, the coil element 122 may be compressed to maintain a particular backlash and/or ensure that air gap 131 (e.g., FIG. 3) of a sufficient spacing is maintained. As illustrated, the compression assembly 124 may comprise a base plate 136, coil clamps 138, springs 162, and cooling system 172. In the illustrated embodiment, the coil clamps 138 may be arranged along lateral edges of the base plate 136. As described herein, arranged along the lateral edges of the base plate 136 refers to the coil clamps 138 being arranged along the outer periphery of the lateral sides of the base plate 136, wherein the lateral sides extend between either longitudinal end of the base plate 136. In some embodiments, one or more of the coil clamps 138 may be applied at full compression. In some embodiments, the springs 162 may be arranged to reduce a clamping force and/or reduce force due to thermal strain of the coil element 122.

In some embodiments, coil clamps 138 may secure the base plate 136 to the coil element 122. Linear bearing assemblies 140 may secure the base plate 136 to transmission element 130 (e.g., shown FIG. 2), which may in turn be coupled to a vibrating element (e.g., flextensional shell 104 on FIG. 2). In some embodiments, the base plate 136 may be used to facilitate transfer motion of the coil element 122 to the vibrating element (e.g., flextensional shell 104 shown FIG. 2) by way of the transmission element 130 (e.g., shown on FIG. 2). As illustrated, the base plate 136 may comprise lips 142 at one or both of lateral edges 144 of the base plate 136. In the illustrated embodiment, the base plate 136 is shown as having a slight concavity; however, embodiments may include the base plate 136 being generally flat or convex in shape. As best seen on FIG. 6, the base plate 136 may comprise clamp holes 146 spaced around lateral edges 144 of the base plate 136 for insertion of coil clamps 138. In some embodiments, the clamp holes 146 may be equally spaced, but other spacing of the clamp holes 146 may also be used in accordance with example embodiments. With continued reference to FIG. 6, the base plate 136 may also comprise bearing holes 148 for receiving the linear bearing assemblies 140. Any suitable fastener, such as screws 150 and washers 152, may be used to secure the linear bearing assemblies 140 to base plate 136. The linear bearing assemblies 140 may serve to maintain a safe clearance between static (e.g., magnetic return path components) and dynamic (e.g., coil element 122 and associated components). Maintaining clearance is required to ensure the coil element 122 is not obstructed and free to create the motion required to generate acoustic signals. Other components that may be used to maintain this separation may include, without limitation, air bearings, thin film oil bearings, roller or ball bearings, flexures, wheels, and guides.

Referring again to FIGS. 5-7, the coil element 122 will now be described in accordance with example embodiments. As previously described, coil element 122 may be positioned in an air gap 131 of a magnetic assembly 118 (e.g., shown on FIG. 3). The coil element 122 may comprise a pair of coils 128. The coils 128 may be mechanically coupled. Without limitation, any suitable type of coils 128 may be used including ribbon foil coils (as shown in the embodiment), bitter coils, traditional magnet wire coils, or constructed by any device carrying an electrical current that generates a magnetic field utilizing the locomotive forcing function to generate motion. While FIGS. 5-7 illustrate a pair of coils 128, embodiments of the coil element 122 may utilize a single coil 128 or three or more coils 128 in place of the pair of coils 128 that are illustrated. In operation, current may be sent through the coil element 122 to generate a magnetic field. Due to interaction with magnetic assembly 118 (e.g. shown on FIG. 3), the coil element 122 may move in air gap 131. An electrical connection 154 may be made at either end of the coil element 122. The electrical connection 154 may include one or more flexible current carrying wires with electrical terminations at either end. The electrical termination could consist of standard connectors capable of carrying the amount of current required to obtain the desired current density. The connectors must also mechanically secure the flexible wire to the coil and to the electrical circuit that generates the required electrical signal. The termination could also consist of a copper material (or any material with high electrical conductivity such as aluminum or silver) capable of carrying the current and providing a mechanical connection.

As previously described, coil clamps 138 may be used to couple the coil element 122 to the base plate 136. The coil clamps 138 may secure the base plate 136 to the coil element 122, for example, to maintain mechanical connection between the coil element 122 and the vibrating element (e.g., flextensional shell 104 shown on FIG. 2). As illustrated, a plurality of coil clamps 138 may be provided. As illustrated, a plurality of coil clamps 138 may be arranged along the lateral edges 144 of the base plate 136. As illustrated, the coil clamps 138 may be equally spaced along both lateral edges 144, but other spacing of the coil clamps 138 may also be selected dependent upon a particular application. In the illustrated embodiment, the coil clamps 138 may each comprise a first clamp portion 156 and a second clamp portion 158. Bolts 160 or other suitable fasteners may be used to secure the first clamp portion 156 to the second clamp portion 158. In the illustrated embodiments, the bolts 160 may thread directly into the second clamp portion 158, but nuts or other suitable arrangements may also be used for closing the coil clamps 138.

The coil clamps 138 may be configured to hold the base plate 136 and the coil element 122 tightly together to restrict movement and prevent separation through application of a pre-compression force to the coil element 122. By way of example, the coil clamp 138 may constrain movement of the coil element 122 in at least one direction. In the illustrated embodiment, movement of the coil element 122 may be constrained in the x-direction and the y-direction. However, maintaining contact between the vibrating element (e.g., flextensional shell 104 shown FIG. 2) and the coil element 122 by means of a pre-stressed connection may result in thermal stress buildup within the coil element 122. Moreover, increasing acoustic output may increase the thermal stress to a point where the coil element 122 may buckle where it is unconstrained. In the illustrated embodiment, the coil element 122 may be unconstrained, so the coil element 122 may twist and/or translate in the z-direction and into the air gap 131 (e.g., shown on FIG. 3). However, maintaining the air gap 131 may be needed as the moving-coil transducer 116 (e.g., shown on FIG. 3) may have a static component (e.g., magnetic assembly 118 on FIG. 3) and a dynamic component (e.g., coil element 122) with potentially very high velocities. If these two components are not separated, rubbing/binding may occur, in some embodiments, and the softer material (e.g., coil element 122) may begin to lose material due to friction. Additionally, the coil element 122 may be at an electric voltage potential much higher than the magnetic assembly 118 and may need to maintain electrical separation, for example, to prevent failure due to electrical circuit damage and/or shorting. Allowing room (e.g., backlash) for thermal strain may reduce and/or minimize thermal stress buildup within the coil element 122. However, adding backlash to the design of the coil element 122 may alter the overall system dynamics causing the system to suffer from non-repeatability, among other consequences.

Figure 8:
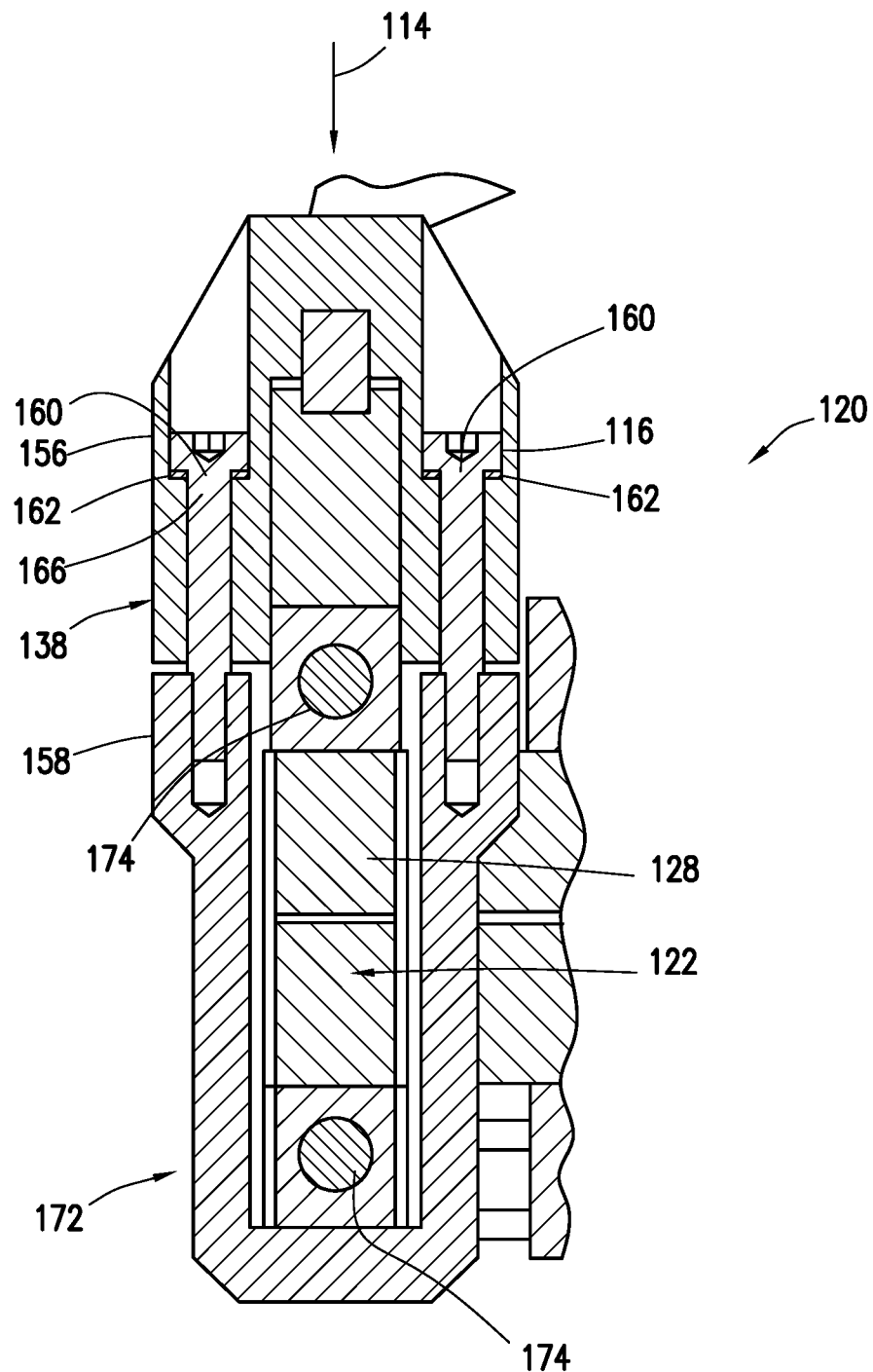
FIG. 8 is an enlarged view of a portion of the coil assembly of FIG. 7 in partial cross-section in accordance with present embodiments.

With reference to FIGS. 6 and 8, springs 162 may be placed in a load path 164 of one or more of the coil clamps 138, for example, to reduce the resting force of the coil assembly 120 to thermal expansion. As illustrated, the springs 162 may be disposed between a head 166 of the bolts 160 and the first clamp portion 156. However, other suitable configurations may be used so that the springs 162 may allow for thermal expansion. For example, the springs 162 may be placed in the second clamp portion 158, they may also be placed between the first clamp portion 156 and second clamp portion 158. The springs may be placed anywhere in the assembly as long as they are in the same load path as the coil elements 122. The springs 162 may each have a spring rate sized to ensure that unloading does not occur during maximum dynamic conditions. In some embodiments, the spring rate may be sufficiently compliant to allow thermal expansion of the coil element 122 without undesired twisting/buckling of the coil element into the air gap 131 (e.g., shown on FIG. 3). Without limitation, the springs 162 may have a spring rate of from about 289e6 Newtons per meter ("N/m") to about 392e6 N/m and alternatively, from about 322 e6 N/m to about 325 e6 N/m. The spring rate may be sized to ensure pre-compression is maintained in the connection during dynamic operation in that the coil assembly 120 may always be in compression with no tensile loading. Any suitable type of spring element may be used for the springs 162 including, without limitation, disc springs, coil springs, torsional springs, leaf springs, or any device with a spring rate near the target values. best seen on FIG. 6, the springs 162 may be in the form of a stack of disc springs in parallel. Disc springs are generally a type of spring shaped like a washer and may also be known as Belleville washers or Belleville springs.

Embodiments of the compression assembly 124 may further comprise a spacer 168 and an insulating element 170, as illustrated on FIGS. 5 and 6. Spacer 168 may be disposed between base plate 136 and coil element 122. As illustrated, spacer 168 may be in the form of a pair of plates positioned on either lateral side of the base plate 136 and generally placed transverse to the base plate 136. Without limitation, the spacer 168 may comprise a material with low density to minimize dynamic mass and have good mechanical properties, such as high Young's modulus and compressive strength. Examples of suitable materials may include fiberglass, fiberglass epoxy laminates (e.g., Garolite) glass-filled polyetherimide and other glass-filled materials. As illustrated, insulating element 170 may be arranged to electrically insulate the lateral sides of coil element 122. By way of example, the lateral sides of coil element 122 may be sandwiched between corresponding layers of the insulating element 170. Without limitation, insulating element 170 may comprise any suitable material, including most thermoplastic materials, epoxies, or resins with high electrical resistivity.

Embodiments of the compression assembly 124 may further comprise a cooling system 172, as illustrated on FIGS. 5-8. Cooling system 172 may be operable to circulate a coolant to remove heat from coil element 122. Cooling system 172 may comprise cooling channels 174 for circulation of the coolant. As illustrated, the cooling channels 174 may be pathways arranged along the coil element 122 that direct the flow of a coolant through cooling system 172 and along the coil element 122. By way of example, the cooling channels 174 may comprise sealed pipes, tubes, or other conduit through which flow of the coolant may be directed. While the coolant may not be in direct contact with the coil element 122, heat may be transferred from coil element 122 to coolant by conduction. As illustrated, cooling channels 174 may extend at least partially along the coil element 122. For example, cooling channels 174 may be on top of and below the lateral sides of the coil element 122. In the illustrated embodiments, the cooling channels 174 may be clamped to the coil element 122 by way of coil clamps 138. In some embodiments, the springs 162 may be sized to reduce, prevent, and/or minimize unloading of the coil element 122 to the interface with the cooling channels 174. In some embodiments, the springs 162 may be sized to prevent coil element 122 to cooling channel 174 un-coupling under a hypothetical full dynamic load.

In accordance with further embodiments, alternative techniques may be used for thermal stress relief of coil element 122. By way of example, a clamping force applied to the coil element 122 may be reduced, for example, to allow for sliding between the cooling channels 174 and the coil element 122. For example, one set of the coil clamps 138 may be clamped more than another set of the coil clamps 138. That is, one set of the coil clamps 138 may operate at a higher magnitude of torque than another set of the coil clamps 138. In some embodiments, the coil clamps 138 on one lateral side of the base plate 136 may be clamped more than the coil clamps on the other lateral side of the base plate 136. In at least one embodiment, at least one of the remaining coil clamps 138 may have a reduced torque applied and/or may include a washer (e.g., a Belleville spring) for example, under a head 166 of one of the bolts 160. By way of example, reducing the amount of torque applied to one set of coil clamps 138 may reduce an amount of backlash in the system. In some embodiments, grease may be applied to one or more of the coil clamps 138, one or more of the coil elements 122, and/or the washer to facilitate a reduction in frictional force between the components. As a non-limiting example, thermal grease could be applied to one or more of the components.

In some embodiments, one or more of the coil clamps 138 may be secured while the coil element 122 is under thermal load. For example, the temperature of the coil element 122 may be elevated allowing it to expand to full thermal strain and then applying torque to the coil clamps 138. In some embodiments, a tensile load may be applied as the temperature of the coil element 122 is altered. This may reduce or eliminate compressive stress and lead to a reduction in buckling.

In some embodiments, a stiffness of the coil assembly 120 may be increased. For example, the coils 126 may be bonded at a particular edge. For example, the coils 126 may be bonded at a bottom edge. In some embodiments, an epoxy bond may be added between one or more of the coils 126. In this regard, additional stiffness may be provided to the coils 126 to reduce bending and/or buckling. In some embodiments, the coil element 122 may be bonded and/or coupled to one or more cooling channels 174.

In some embodiments, at least one of the cooling channels 174 may be segmented. For example, at least one of the cooling channels 174 may be segmented with joints to allow for the at least one of the cooling channels 174 to move (e.g., "float") with expansion of the coil element 122. By way of further example, the cooling channels 174 may comprise multiple channel portions that may each by separated by spaced joints. In an exemplary embodiment, the cooling channels 174 may comprise a first cooling channel portion and a second cooling channel portion, wherein a joint may join the first cooling channel portion and the second cooling channel portion. The joint may be constructed to allow movement so that first cooling channel portion and the second cooling channel portion may be allowed to move with respect to one another, thus enabling the cooling channels 174 to move with expansion of the coil element 122. In some embodiments, axial stiffness of the cooling channels 174 may be reduced. In some embodiments, an interface, for example, a low friction interface, may be added between the coil element 122 and at least one of the cooling channels 174. For example, a low friction coefficient ceramic insulator may be added between the coil element 122 and at least one of the cooling channels 174 to allow for the coil element 122 to expand and/or contract. If the interface is non-thermally conductive, a thermal path may be provided, for example, via a copper ribbon, to one or more sides of the at least one of the cooling channels 174. In some embodiments, a thermal path may be "sandwiched" between one of the coils 127 and a low friction material. In some embodiments, the coil element 122 may be bound inside of a Garolite "H" structure to reduce localized twisting, for example. The "H" structure may provide the necessary mechanical structure to withstand the forces generated by the thermal stress of the coil element 122, the locations inside the structure where material is not present (between the upper and lower channels) are where the coil element 122 resides.

In some embodiments, the coil element 122 may comprise an hourglass planform coil. An hourglass planform coil may allow for buckle prevention. In some embodiments, a thermally conductive and/or electrically insulative material may be interleaved with the coil element 122 and/or a conductor of the coil element 122 (i.e., coil conductor). In some embodiments, direct heat transfer may be facilitated from the coil element 122 and/or coil conductor to an interleaved material to at least one of the cooling channels 174. For example, heat may be directly transferred from the coil element 122 and/or coil conductor to a thin conductive material to a cooling channel.

In some embodiments, the coil element 122 may comprise a bitter coil design. In the example of a bitter coil design, a cooling system may be provided to flush and/or bypass various manifolds in the coil assembly 120, for example, aluminum manifolds, or comprising a material with high thermal conductivity. In some embodiments, coolant may be in direct contact with coil conductors, which may reduce or eliminate a thermal insulation boundary. The manifold may be comprised of one or more combinations of materials. The bitter coil design may minimize thermal expansion of coil conductors (e.g., copper conductors) in the coil element 122 and/or may provide a reduction of thermal heating within the coil element 122.

In some embodiments, the air gap 131 may be enlarged to provide additional space and/or clearance. For example, the air gap 131 associated with the magnetic assembly 118 may be enlarged to provide additional space and/or clearance, for example between the magnetic assembly 118 and the coil element 122.

Figure 9:
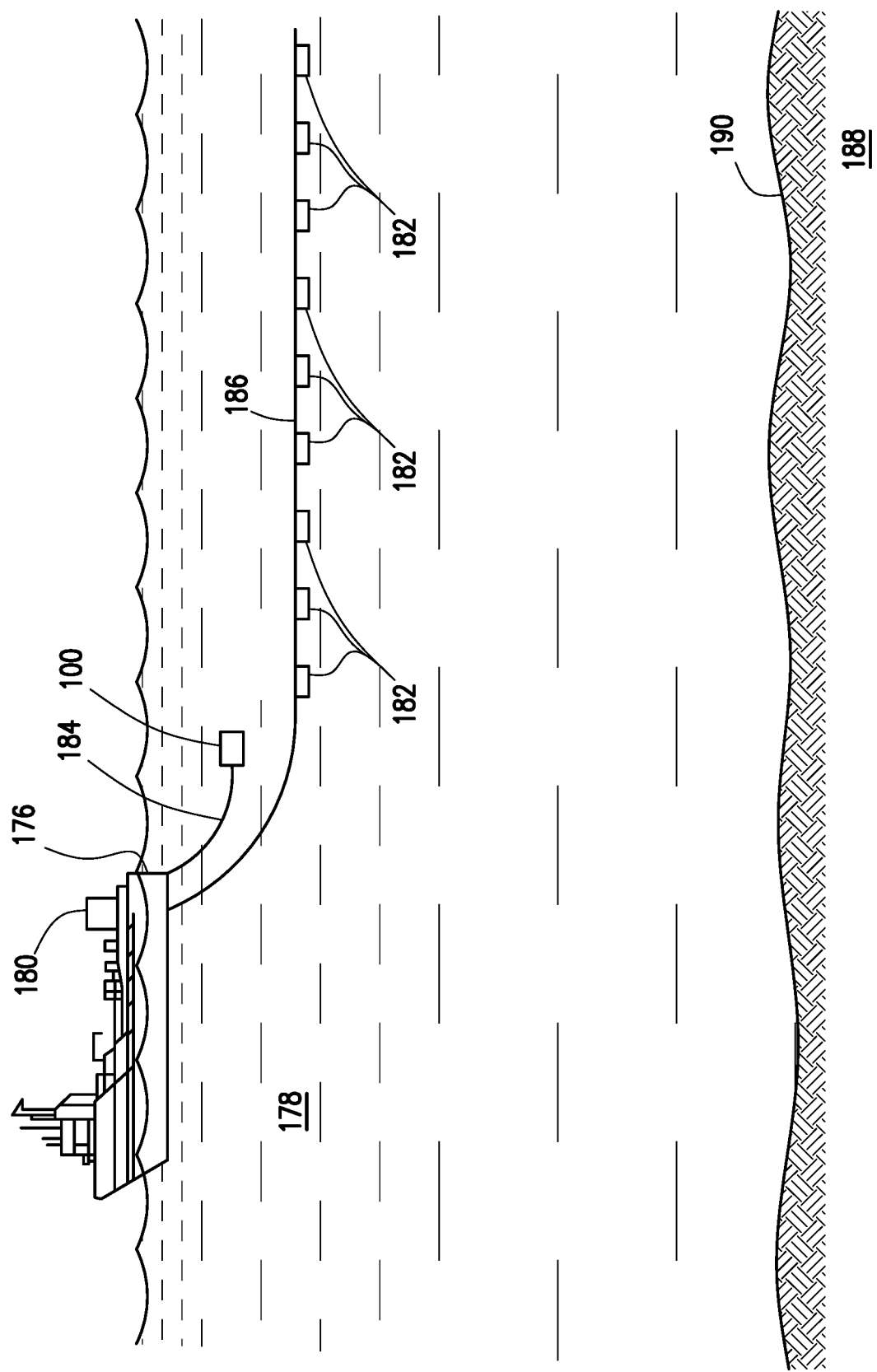
FIG. 9 is an example embodiment of a marine seismic survey system using a sound source in accordance with present embodiments.

FIG. 9 illustrates an example technique for acquiring marine seismic data that may be used with embodiments of the present techniques. In the illustrated embodiment, a survey vessel 176 moves along the surface of a body of water 178, such as a lake or ocean. The survey vessel 176 may include thereon equipment, shown generally at 180 and collectively referred to herein as a "recording system." The recording system 180 may include devices (none shown separately) for detecting and making a time indexed record of signals generated by each of seismic sensors 182 (explained further below) and for actuating a marine acoustic vibrator 100 at selected times. The recording system 180 may also include devices (none shown separately) for determining the geodetic position of the survey vessel 176 and the various seismic sensors 182.

As illustrated, the survey vessel 176 (or a different vessel) may tow the marine acoustic vibrator 100 in the body of water 178. By way of example, a method may include disposing the marine acoustic vibrator 100 in the body of water 178. A source cable 184 may couple the marine acoustic vibrator 100 to the survey vessel 52. While only a single marine acoustic vibrator 100 is shown in FIG. 9, it is contemplated that embodiments may include more than one marine acoustic vibrator 100 towed by the survey vessel 176 or a different vessel. In some embodiments, one or more arrays of marine acoustic vibrators 100 may be used. At selected times, the marine acoustic vibrator 100 may be triggered, for example, by the recording system 180, to generate acoustic energy. The survey vessel 176 (or a different vessel) may further tow at least one sensor streamer 186 to detect the acoustic energy after it has interacted, for example, with one or more subterranean formations 188 below the water bottom 190. As illustrated, both the marine acoustic vibrator 100 and the sensor streamer 186 may be towed above the water bottom 190. In some embodiments, more than one sensor streamer 186 may be towed by the survey vessel 176, which may be spaced apart laterally, vertically, or both laterally and vertically. The sensor streamer 186 may contain seismic sensors 182 thereon at spaced apart locations. The seismic sensors 182 may be any type of seismic sensors 182 known in the art, including hydrophones, particle velocity sensors, particle displacement sensors, particle acceleration sensors, or pressure gradient sensors, for example. By way of example, the seismic sensors 182 may generate response signals, such as electrical or optical signals, in response to detected acoustic energy. Signals generated by the seismic sensors 182 may be communicated to the recording system 180. The detected energy may be used to infer certain properties of the one or more subterranean formations 188, such as structure, mineral composition and fluid content, thereby providing information useful in the recovery of hydrocarbons.

In accordance with example embodiments, a geophysical data product indicative of certain properties of the one or more subterranean formations 188 may be produced from the detected acoustic energy. The geophysical data product may include acquired and/or processed seismic data and may be stored on a non-transitory, tangible computer-readable medium. The geophysical data product may be produced offshore (i.e. by equipment on a vessel) or onshore (i.e. at a facility on land) either within the United States and/or in another country. Specifically, embodiments may include producing a geophysical data product from at least the measured acoustic energy and storing the geophysical data product on a tangible, non-volatile computer-readable medium suitable for importing onshore. If the geophysical data product is produced offshore and/or in another country, it may be imported onshore to a facility in, for example, the United States or another country. Once onshore in, for example, the United States (or another country), further processing and/or geophysical analysis may be performed on the geophysical data product.

The foregoing figures and discussion are not intended to include all features of the present techniques to accommodate a buyer or seller, or to describe the system, nor is such figures and discussion limiting but exemplary and in the spirit of the present techniques.

What is claimed is:

1. An apparatus comprising:
    a moving-coil transducer comprising:
        a coil element comprising one or more coils;
        a coil clamp constraining motion of the coil element in at least one direction; and
    a resilient member disposed in a load path of the coil clamp of the moving coil transducer to allow thermal expansion of the coil element of the moving-coil transducer;
    wherein the coil clamp comprises a first clamp portion, a second clamp portion, and a fastener securing the first clamp portion to the second clamp portion, wherein the resilient member is disposed between a portion of the fastener and a portion of the first clamp portion.

2. The apparatus of claim 1, wherein the resilient member is selected from the group consisting of a disc spring, a coil spring, a torsional spring, a leaf spring, and any combination thereof.

3. The apparatus of claim 1, wherein the resilient member has a spring rate of from about 289e6 Newtons per meter to about 329e6 Newtons per meter.

4. The apparatus of claim 1, wherein the fastener threads directly into the second clamp portion.

5. The apparatus of claim 1, further comprising a base plate, wherein the coil clamp secures the base plate to the coil element.

6. The apparatus of claim 5, wherein a plurality of coil clamps are arranged along lateral edges of the base plate, and wherein the plurality of coil clamps secure the base plate to the coil element.

7. The apparatus of claim 1, further comprising a cooling system comprising cooling channels arranged along the coil element.

8. The apparatus of claim 7, wherein at least one of the cooling channels is segmented with joints to allow movement of the at least one of the cooling channels with expansion of the coil element.

9. The apparatus of claim 1, wherein the coil is a bitter coil.

10. A marine acoustic vibrator comprising:
a vibrating element; and
a moving-coil transducer coupled to the vibrating element and operable to effect vibration of the vibrating element, wherein the moving-coil transducer comprises a coil element comprising a coil, a coil clamp constraining motion of the coil element in at least one direction, a base plate for facilitating transfer of motion of the coil element to the vibrating element, wherein the coil clamp secures the base plate to the coil element, and a resilient member disposed in a load path of the coil clamp, wherein the coil clamp comprises a first clamp portion, a second clamp portion, and a fastener securing the first clamp portion to the second clamp portion, wherein the resilient member is disposed between a portion of the fastener and a portion of the first clamp portion.

11. The marine acoustic vibrator of claim 10, wherein the vibrating element is a flextensional shell.

12. The marine acoustic vibrator of claim 10, wherein the resilient member is selected from the group consisting of a disc spring, a coil spring, a torsional spring, a leaf spring, and any combination thereof.

13. The marine acoustic vibrator of claim 10, wherein the fastener threads directly into the second clamp portion.

14. The marine acoustic vibrator of claim 10, further comprising a base plate for facilitating transfer of motion of the coil element to the vibrating element, wherein the coil clamp secures the base plate to the coil element.

15. The marine acoustic vibrator of claim 14, wherein a plurality of coil clamps are arranged along lateral edges of the base plate, and wherein the plurality of coil clamps secure the base plate to the coil element.

16. The marine acoustic vibrator of claim 10, further comprising a cooling system comprising cooling channels arranged along the coil element.

17. A method comprising:
disposing a marine acoustic vibrator in a body of water; and
actuating a moving-coil transducer of the marine acoustic vibrator to cause a vibrating element of the marine acoustic vibrator to generate acoustic energy, wherein a resilient member is disposed in a load path of a coil clamp of the moving coil transducer to allow thermal expansion of a coil element of the moving-coil transducer, wherein the coil clamp comprises a first clamp portion, a second clamp portion, and a fastener securing the first clamp portion to the second clamp portion, wherein the resilient member is disposed between a portion of the fastener and a portion of the first clamp portion.

18. The method of claim 17, further comprising:
detecting the acoustic energy after the acoustic energy has interacted with one or more subterranean formations below a water bottom; and
producing a geophysical data product indicative of one or more properties of the one or more subterranean formations.

19. The method of claim 18, further comprising storing the geophysical data product on a non-transitory, tangible computer-readable medium.

20. The method of claim 19, further comprising importing the geophysical data product onshore to a facility in the United States or another country.

21. The method of claim 17, wherein one or more coil clamps constrain motion of the coil element in one or more directions, by securing the coil element to a base plate.

22. A method comprising:
providing a moving-coil transducer comprising a coil element;
clamping the coil element using a coil clamp to constrain the coil element in at least one direction, wherein a resilient member is disposed in a load path of the coil clamp to allow thermal expansion of the coil element, wherein the coil clamp comprises a first clamp portion, a second clamp portion, and a fastener securing the first clamp portion to the second clamp portion, wherein the resilient member is disposed between a portion of the fastener and a portion of the first clamp portion; and
disposing the coil element in an air gap of a magnetic assembly.

23. The method of claim 22, wherein the step of clamping comprises clamping a base plate to the coil element.

24. The method of claim 23, further comprising clamping the base plate to the coil element using a plurality of coil clamps arranged along lateral edges of the base plate.

25. The method of claim 24, wherein one set of the coil clamps operates at higher magnitude of torque than another set of the coil clamps.

* * * * *